(12) United States Patent
Kaminosono

(10) Patent No.: US 7,900,221 B2
(45) Date of Patent: Mar. 1, 2011

(54) TELEVISION RECEIVER WITH DISK PLAYING FUNCTION

(75) Inventor: Takeshi Kaminosono, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1429 days.

(21) Appl. No.: 11/345,234

(22) Filed: Feb. 2, 2006

(65) Prior Publication Data
US 2006/0171690 A1 Aug. 3, 2006

(30) Foreign Application Priority Data
Feb. 2, 2005 (JP) .............................. 2005-025973

(51) Int. Cl.
*G11B 17/04* (2006.01)
(52) U.S. Cl. ...................................... 720/626; 386/358
(58) Field of Classification Search ......... 386/358–362; 720/622, 626, 645; 369/13.2, 30.36, 30.52
See application file for complete search history.

(56) References Cited

U.S. PATENT DOCUMENTS

| | | | | |
|---|---|---|---|---|
| 5,150,349 A | * | 9/1992 | Takai et al. | ................. 720/626 |
| 5,905,696 A | * | 5/1999 | Kanazawa et al. | ......... 369/13.2 |
| 6,122,231 A | * | 9/2000 | Watanabe et al. | ......... 369/30.52 |
| 6,249,500 B1 | * | 6/2001 | Kanazawa et al. | ........... 720/645 |
| 6,442,122 B1 | * | 8/2002 | Takahashi | ................... 720/645 |
| 6,577,579 B1 | * | 6/2003 | Kakuta et al. | ................ 720/622 |
| 2002/0037156 A1 | * | 3/2002 | Kobayashi | ................... 386/68 |
| 2003/0112716 A1 | * | 6/2003 | Otsuki et al. | .............. 369/30.36 |

FOREIGN PATENT DOCUMENTS

JP 11-288542 * 10/1999
JP 2003-263873 A 9/2003

* cited by examiner

*Primary Examiner*—Thai Tran
*Assistant Examiner*—Mishawn Dunn
(74) *Attorney, Agent, or Firm*—Global IP Counselors

(57) ABSTRACT

A disk playing device includes: a body portion having a disk insertion slot for; a disk playing unit that plays a disk inserted through the disk insertion slot; a slot-in type disk insertion unit that draws in the disk inserted in the disk insertion slot toward the disk playing unit; a sub control unit that drives the disk insertion unit and plays the disk with the disk playing unit; a main control unit; and a disk insertion detection unit that detects a disk and output an insertion detection signal to the main control unit when the disk is inserted in the disk insertion slot, The main control unit determines whether or not the sub control unit is turned OFF when a disk insertion signal is received from the disk insertion detection unit, and drives the disk insertion unit if the sub control unit is OFF.

7 Claims, 8 Drawing Sheets

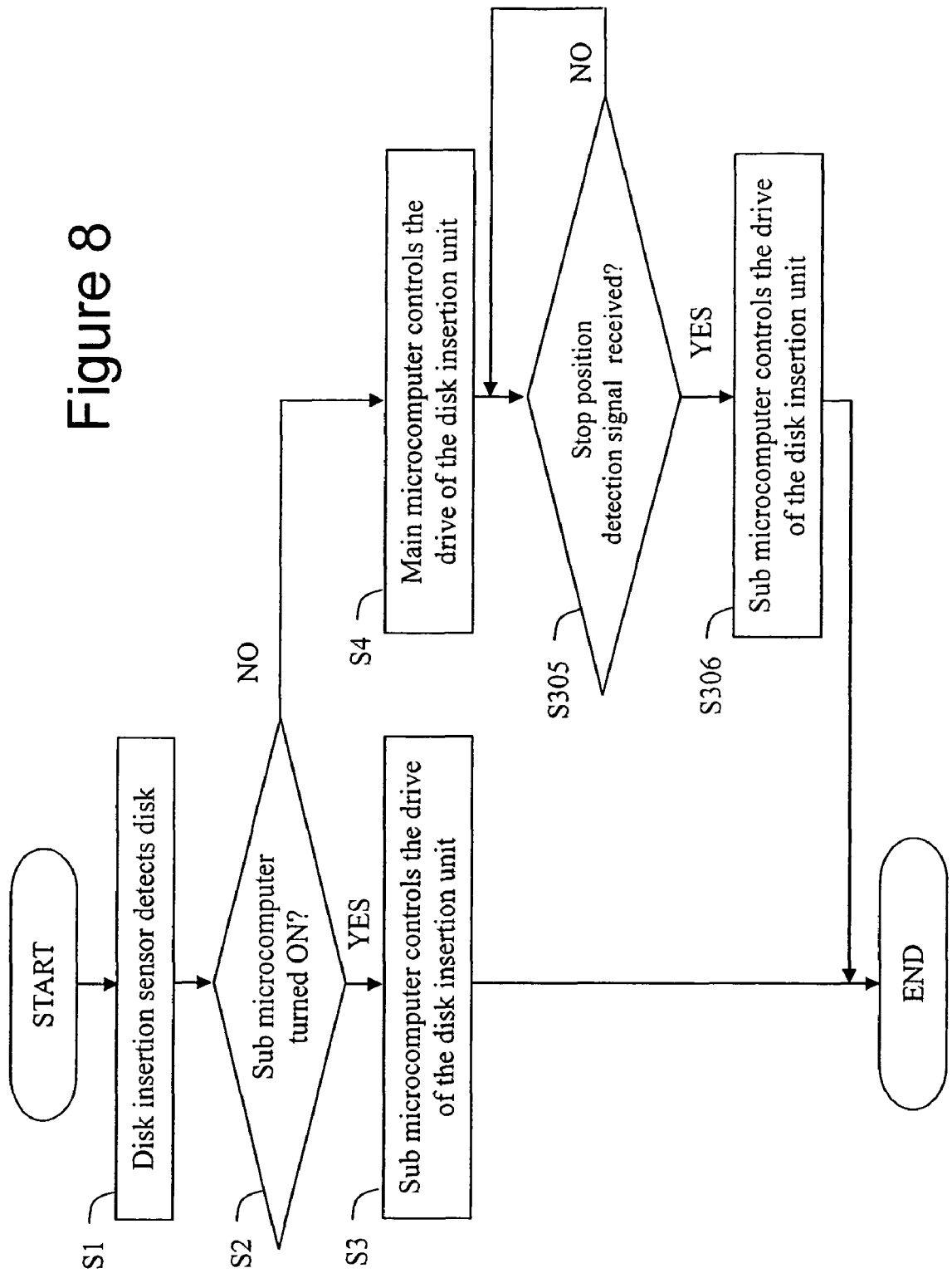

TELEVISION RECEIVER WITH DISK PLAYING FUNCTION

BACKGROUND OF THE INVENTION

1. Field of the Invention

The present invention generally relates to a disk playing device. More specifically, the present invention relates to a television receiver with a disk playing function.

2. Background Information

There are known liquid crystal television receivers with a built-in a disk playing device (hereinafter referred to as "television with built-in disk playing device"), which are television receivers with a LCD (liquid crystal display) (hereinafter referred to as "liquid crystal television") combined with a disk playing device that plays media such as VCD (video compact disc), DVD (digital versatile disk), DV (digital video) and the like.

In a television with a built-in disk playing device, when the liquid crystal television is used but the disk playing device is not used, the disk playing device is turned OFF to reduce power consumption and prevent adverse effects on the liquid crystal television such as noise generated by the disk playing device.

Specifically, for example, there are disk playing devices that reduce power consumption by having a host computer control the power supplied to the deck module when the disk playing device is not in use. The host computer uses a switch for outputting an instruction to open the front panel of the disk insertion unit to control the power supply, such that the power supplied from a power source to the deck module is normally stopped.

In such disk playing device incorporated in the television with built-in disk playing device, when a disk is inserted into the disk playing device while only the power supply to the liquid crystal television is turned ON and the power supply to the disk playing device is turned OFF, the power supply to the disk playing device is turned ON only after the main function transitions from the liquid crystal television to the disk playing device. Accordingly, there is a possibility that the disk may be damaged if the disk is inserted and removed repeatedly as it takes a while for the disk to be inserted right away to perform a subsequent start operation.

In view of the above, it will be apparent to those skilled in the art from this disclosure that there exists a need for an improved disk device that addresses the above discussed problems. This invention addresses this need in the art as well as other needs, which will become apparent to those skilled in the art from this disclosure.

SUMMARY OF THE INVENTION

An object of the present invention is to provide a disk device such as a television receiver with a disk playing function to which a disk can be inserted into with less likelihood of causing damage to the disk, while allowing power consumption to be reduced.

In order to resolve these problems, an aspect of the invention provides a disk playing device including: a body portion having a disk insertion slot formed thereon; a disk playing unit adapted to play a disk inserted through the disk insertion slot; a slot-in type disk insertion unit adapted to draw in the disk inserted in the disk insertion slot toward the disk playing unit; a sub control unit operatively connected to the disk insertion unit and the disk playing unit to drive the disk insertion unit and play the disk with the disk playing unit; a main control unit operatively connected to the disk playing unit, the disk insertion unit, and the sub control unit; and a disk insertion detection unit configured to detect a disk and output an insertion detection signal to the main control unit when the disk is inserted in the disk insertion slot. The main control unit is configured to determine whether or not the sub control unit is turned OFF when a disk insertion signal is received from the disk insertion detection unit. The main control unit is configured to drive the disk insertion unit when it is determined that the sub control unit is OFF.

According to this aspect of the invention, when a disk is inserted while the sub control unit for controllably driving the disk insertion unit is turned OFF, the disk insertion unit is controllably driven by the main control unit.

In this way, even if the sub control unit is turned OFF when a disk is inserted, the insertion of the disk can be rapidly started by the main control unit without having to wait for the sub control unit to start, such that the disk can be inserted in the disk insertion slot with less likelihood of damage to the disk.

Furthermore, the sub control unit can be set to the OFF condition so as to reduce power consumption when the sub control unit is not required, since insertion of a disk in the disk insertion unit can be started even when the sub control unit for controllably driving the disk inserted unit is turned OFF.

The disk device preferably also includes an intermediate position detection unit configured to detect the disk and output an intermediate position detection signal when the disk passes a predetermined position as the disk insertion unit draws in the disk toward the disk playing unit. When it is determined that the sub control unit is OFF at the time the disk insertion signal is received from the disk insertion detection unit, the main control unit being further configured to turn the sub control unit ON and, when an intermediate position detection signal is received from the intermediate position detection unit, the main control unit being further configured to turn over the driving of the disk insertion unit to the sub control unit.

According to this aspect of the invention, when the drive control of the disk insertion unit is started by the main control unit, and particularly when the sub control unit is turned OFF during a disk insertion, the drive control of the disk insertion unit is turned over from the main control unit to sub control unit when the disk arrives at a predetermined intermediate position.

Therefore, the same operation of controllably driving the disk insertion unit for the sub control unit (for example, a series of operations including an operation of drawing in a disk, operation of chocking a disk, operation of loading a disk and the like) can be accomplished by the main control unit without having to modify the existing software programs. As a result, not only are cost increases restrained, the operations subsequent to the operation of drawing in a disk (for example, the chocking operation, loading operation and the like) can be accomplished smoothly by switching the drive control of the disk insertion unit during the disk draw-in operation.

The disk device preferably also includes a clock unit configured to output an elapsed time signal to the main control unit when a predetermined time has elapsed after the insertion detection signal is received from the disk insertion detection unit. When it is determined that the sub control unit is OFF at the time the disk insertion signal is received from the disk insertion detection unit, the main control unit being further configured to turn the sub control unit ON and, when an elapsed time signal is received from the clock unit, the main control unit being further configured to turn over the driving of the disk insertion unit to the sub control unit.

According to this aspect of the invention, when the drive control of the disk insertion unit is started by the main control unit, which is when the sub control unit is turned OFF during a disk insertion, the drive control of the disk insertion unit is switched from the drive control by the main control unit to the drive control by the sub control unit after a predetermined time period has elapsed since the start of the disk insertion.

Therefore, the same operation of controllably driving the disk insertion unit for the sub control unit (for example, a series of operations including an operation of drawing in a disk, operation of chocking a disk, operation of loading a disk and the like) can be accomplished by the main control unit without having to modify the existing software programs, and without having to provide new detection units. Therefore, cost increases can be retrained.

Furthermore, the operations subsequent to the operation of drawing in a disk (for example, the chocking operation, loading operation and the like) can be accomplished smoothly by switching the drive control of the disk insertion unit to the sub control unit during the disk draw-in operation.

The disk device preferably also includes a stop position detection unit configured to detect a disk and output a stop position detection signal when the disk inserted in the disk insertion slot arrives at a stop position, which is where the disk playing unit plays the disk. When it is determined that the sub control unit is OFF at the time the disk insertion signal is received from the disk insertion detection unit, the main control unit being further configured to turn the sub control unit ON. When a stop position detection signal is received from the stop position detection unit, the main control unit is further configured to turn over the driving of the disk insertion unit to the sub control unit.

According to this aspect of the invention, when the drive control of the disk insertion unit is started by the main control unit, which is when the sub control unit is turned OFF during a disk insertion, and the drive control of the disk insertion unit is turned over from the main control unit to the sub control unit after the inserted disk reaches the stop position.

In this way, a series of drive controls for the insertion of a disk in the disk insertion unit are all executed by the main control unit, and the insertion of a disk in the disk insertion unit can be executed stably.

The disk device preferably also includes a display unit operatively connected to and driven by the main control unit and configured to display images of the disk played by the disk playing unit.

The disk device preferably also includes a receiving unit adapted to receive television broadcast signals. The display unit is further configured to display television images based on the television broadcast signals received by the receiving unit.

Another aspect of the present invention provides a television receiver with disk playing function, including a body portion having a disk insertion slot formed thereon; a disk playing unit adapted to play a disk inserted through the disk insertion slot; a slot-in type disk insertion unit adapted to draw in a disk inserted in the disk insertion slot toward the disk playing unit; a sub control unit operatively connected to the disk insertion unit and the disk playing unit to drive the disk insertion unit and play the disk with the disk playing unit; a main control unit operatively connected to the disk playing unit, the disk insertion unit, and the sub control unit; a receiving unit adapted to receive television broadcast signals; a display unit operatively connected to and driven by the main control unit and configured to display images of the disk played by the disk playing unit and television images based on the television broadcast signals received by the receiving unit; a disk insertion detection unit configured to detect a disk and output an insertion detection signal to the main control unit when the disk is inserted in the disk insertion slot; and an intermediate position detection unit configured to detect the disk and output an intermediate position detection signal when the disk passes a predetermined position as the disk insertion unit draws in the disk toward the disk playing unit. The main control unit is configured to determine whether or not the sub control unit is turned OFF when a disk insertion signal is received from the disk insertion detection unit. When it is determined that the sub control unit is OFF at the time the disk insertion signal is received from the disk insertion detection unit, the main control unit is configured to turn the sub control unit ON and drive the disk insertion unit. When an intermediate position detection signal is received from the intermediate position detection unit, the main control unit is further configured to turn over the driving of the disk insertion unit to the sub control unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a flow chart of the disk insertion process of the television with disk playing function 300 of the third embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

A first embodiment of the present invention is described in detail hereinafter with reference to the drawings. However, the scope of the invention is not limited to the illustrated examples.

Figure 1:
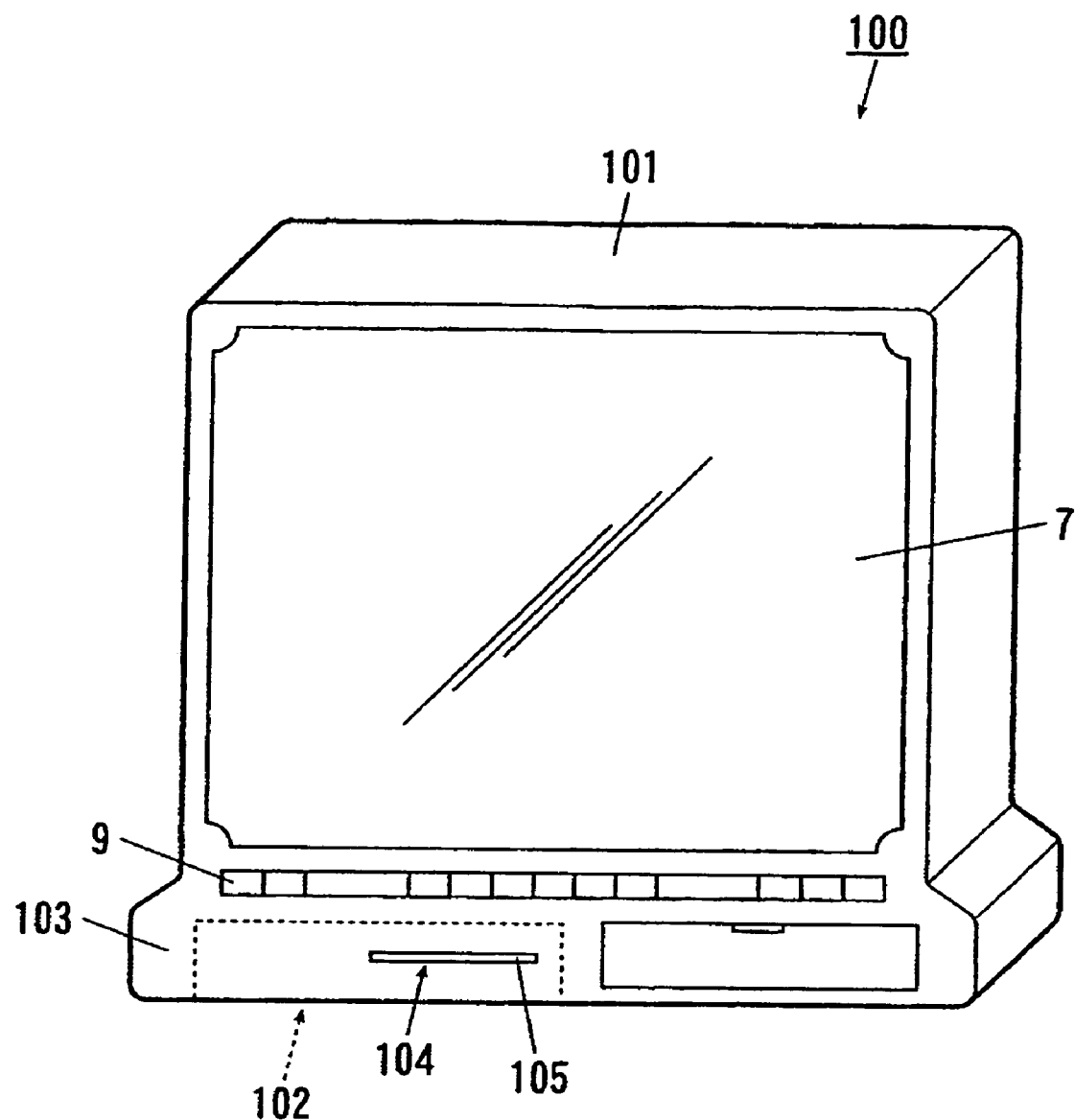
FIG. 1 is a perspective view of a television with disk playing function 100 of embodiments of the present invention.

FIG. 1 is a perspective view of a television receiver with a disk playing function (hereinafter referred to as "television with disk playing function") 100 as an example of a preferred embodiment of the present invention.

The television with disk playing function 100 includes a disk playing device 102 provided in the body of a liquid crystal television 101 having an LCD (liquid crystal display).

A front panel 103 forming the front surface of the television with disk playing function 100 is provided with an image output unit 7 (described later), an operation unit 9 (described later), and a disk insertion slot 104 formed on the front panel 103 of the body portion 102 for inserting a disk such as a VCD (video compact disc), DVD (digital versatile disk), CD (compact disc) or the like. Furthermore, a slot-in type disk insertion unit 105 is provided inside the disk insertion slot 104 such that a disk D that is inserted in the disk insertion slot 104 is drawn toward the disk playing unit 5 (see FIG. 2) inside the device body 102. Since the slot-in type disk insertion unit 105 is a well known component in the art, further explanation thereof will be omitted herein.

Figure 2:
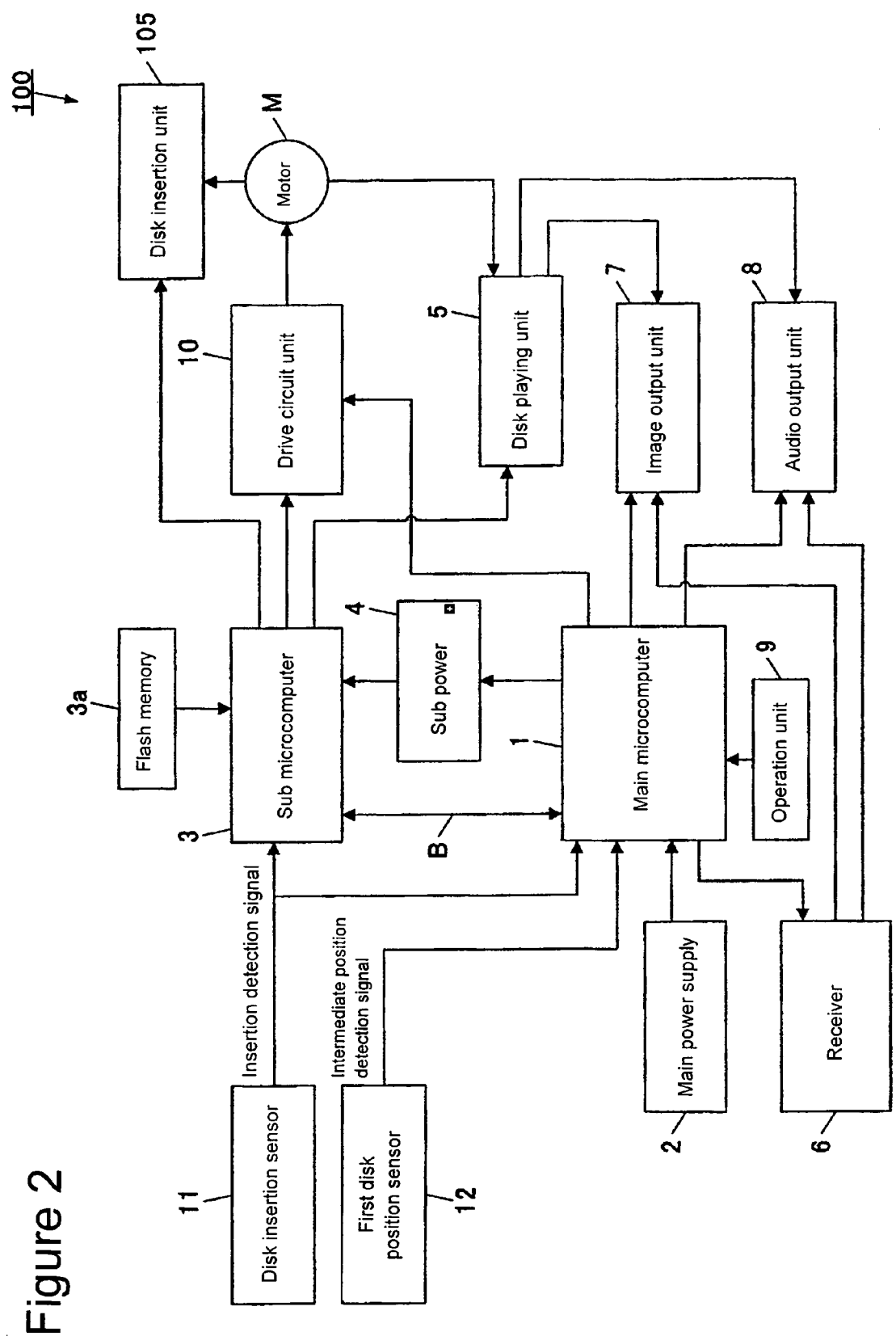
FIG. 2 is a block diagram showing the internal structure of the television with disk playing function 100 of the first embodiment of the present invention.

FIG. 2 is a block diagram showing the internal structure of the television with playback function 100. As shown in FIG. 2, the television with disk playing function 100 is provided with a main microcomputer 1 as a main control unit that generally controls the overall operation of the television with disk playing function 100. The television with disk playing function 100 further includes a main power supply 2, which is connected to the microcomputer 1 and supplies power to the microcomputer 1; a sub microcomputer 3 as a sub control unit for controlling the drive of the disk insertion unit 105; a sub power supply 4, which is connected to the sub microcomputer 3 and supplies power to the sub microcomputer 3; a disk playing unit 5, which is controllably driven by the sub microcomputer 3 and plays a disk inserted in the disk insertion unit 105; a receiver 6 for receiving television broadcast signals; an image output unit 7 which is a display unit controllably driven by the main microcomputer 1 for displaying television images based on television broadcast signals received by the receiver 6 and images played by the disk playing unit 5; an audio output unit 8 for outputting television audio based on television broadcast signals received by the receiver 6 and audio played by the disk playing unit 5; an operation unit 9 for inputting various kinds of instructions; and a drive circuit unit 10 for driving the drive source motors M, which is the drive source for the disk insertion unit 105 and the disk playing unit 5 and the like.

Figure 3:
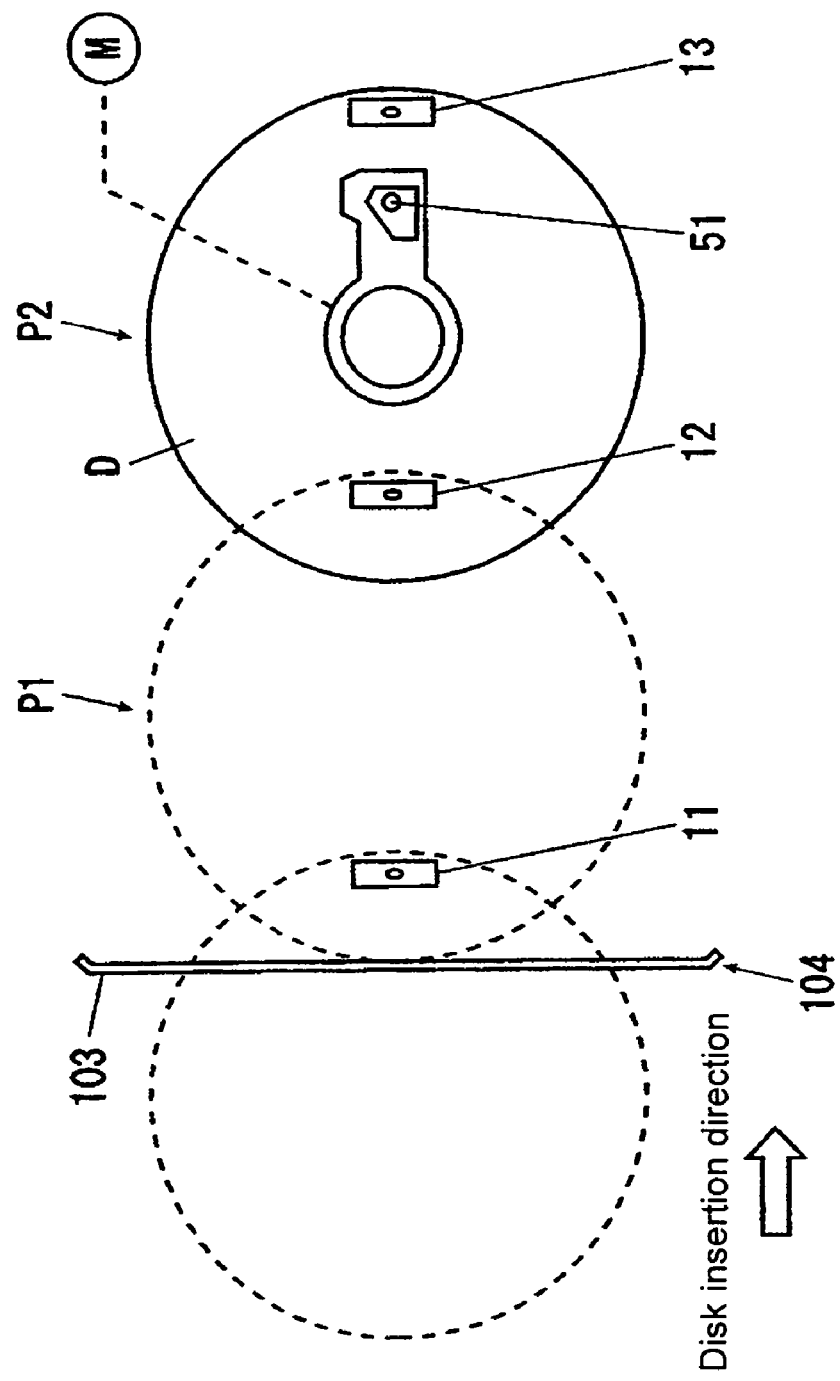
FIG. 3 is a schematic view of the disk insertion unit 105.

The disk insertion unit 105 is provided, for example, with a disk insertion sensor 11, a first disk position sensor 12 and the like, as shown in FIG. 3.

The disk insertion sensor 11 functions as an insertion detection unit for detecting a disk D inserted in the disk insertion slot 104, and outputting an insertion detection signal to the main microcomputer 1. The first disk position sensor 12 functions as an intermediate position detection unit for outputting an intermediate position detection signal when the disk D inserted in the disk insertion slot 104 passes an intermediate position P1 during its movement. The intermediate position P1 is the position at which the disk D in its entirety is accommodated within the device body 102.

That is, when a disk D is inserted in the disk insertion slot 104, the disk D is first detected by the disk insertion sensor 11, and an insertion detection signal is output to the main microcomputer 1.

Then, when the disk D is drawn into the interior of the disk insertion unit 105 and passes the intermediate position P1, at which the disk D in its entirety is accommodated within the device body 102, the first disk position sensor 12 detects the disk D and outputs an intermediate position detection signal to the main microcomputer 1.

The disk insertion sensor 11 and the first disk position sensor 12 are provided with the functions of detecting any disk D and converting the information relating to the disk D to signals and codes transmittable to the main microcomputer 1. More particularly, the disk insertion sensor 11 and the first disk position sensor 12 are, for example, infrared sensors having a photoemitting device (not shown in the drawings) provided with an infrared light emitting lamp for emitting infrared light and a photoreceiving device (not shown in the drawings) provided with a non-contact type infrared sensor for receiving the infrared light emitted by the photoemitting device. In this manner, the disk insertion sensor 11 and the first disk position sensor 12 convert the photoreception result to the detection signals and output such signals to respective microcomputers.

The photoemitting device and the photoreceiving device are arranged at opposite positions on the interior surfaces of the top and bottom surfaces of the chassis (not shown in the drawings) of the disk insertion unit 105. Accordingly, the disk D passes between the photoemitting device and photoreceiving device.

When the disk D is positioned between the photoemitting device (not shown in the drawing) and the photoreceiving device (not shown in the drawing), the infrared light emitted from the photoemitting device toward the photoreceiving device is blocked by the disk D, and the infrared light is not received by the photoreceiving device. This state is called a high state (hereinafter referred to as "H state").

When the disk D is not positioned between the photoemitting device and the photoreceiving device, the infrared light emitted from the photoemitting device toward the photoreceiving device is received by the photoreceiving device. This state is called a low state (hereinafter referred to as "L state").

That is, when the disk D passes through the disk insertion slot 104 and moves toward inside the disk insertion unit 105, the disk D crosses the sensor optical paths of the photoemitting devices and the photoreceiving devices of the disk insertion sensor 11 and first disk position sensor 12. Accordingly, the H state or L state can be detected by the sensors. The detection of the L state or the H state is executed at predetermined specific time intervals, such that the inserted disk D can be quickly detected.

When the H state is detected, the disk insertion sensor 11 outputs an insertion detection signal to the main microcomputer 1.

When the H state is detected, the first disk position sensor 12 outputs an intermediate detection signal to the main microcomputer 1.

The main microcomputer 1 is provided with a CPU (central processing unit), a RAM (random access memory), a ROM (read only memory) and the like not shown in the drawing. Since these components are well known in the art, detailed explanations thereof are omitted herein.

The CPU (not shown in the drawing) generally controls the overall operation of the television with disk playing function 100 by transferring instructions and data to various parts of the television with disk playing function 100 in response to instructions input through the operation unit 9 or according to a predetermined timing, in accordance with various system programs stored in the ROM.

The RAM (not shown in the drawing) is used as a work area by the CPU, and temporarily stores in memory areas various programs read from the ROM and data related to these programs.

The ROM stores data processing programs to be executed by the CPU, and initial setting values and the like related to the data processing programs.

For example, the CPU executes a program stored in the ROM, such that the main microcomputer 1 determines, when the disk insertion sensor 11 provided in the disk insertion unit 105 sends an insertion detection signal to the main microcomputer 1, whether the sub microcomputer 3 is turned OFF. When the sub microcomputer 3 is determined to be turned OFF, the main microcomputer 1 executes the drive control of the disk insertion unit 105.

More specifically, when the disk insertion sensor 11 provided in the disk insertion unit 105 sends an insertion detection signal to the main microcomputer 1, the main microcomputer 1 determines whether or not the sub microcomputer 3 is turned OFF. When the sub microcomputer 3 is determined to be turned OFF, the main microcomputer 1 turns ON the sub power supply 4. When the first disk position sensor 12 sends an intermediate detection signal to the main microcomputer 1, the main microcomputer 1 outputs instructions to the drive circuit unit 10 and the sub microcomputer 3, such that the drive control of the disk insertion unit 105 is switched to drive control of the sub microcomputer 3.

Confirmation of the ON/OFF status of the microcomputer 3 is accomplished by the main microcomputer 1 based on signals that represent a startup condition and are transmitted through a bus B, which connects the main microcomputer 1 and the sub microcomputer 3.

Furthermore, the drive control of the disk insertion unit 105 by the main microcomputer 1 is accomplished by the main microcomputer 1 outputting predetermined control signals to the drive circuit unit 10. The insertion of the disk D into the disk insertion unit 105 is accomplished by the drive circuit unit 10 driving a motor M with predetermined control signals input.

The sub microcomputer 3 is turned ON when the main microcomputer 1 outputs a predetermined control signal to the sub power supply 4.

The main microcomputer 1 controls the open/close states of transistors (not shown in the drawing) provided in the drive circuit unit 10 by outputting predetermined control signals to the drive circuit unit 10 and the sub microcomputer 3. In this manner, the main microcomputer 1 makes the sub microcomputer 3 execute the drive control of the disk insertion unit 105.

The sub microcomputer 3 is provided with a CPU, a RAM, and the like not shown in the drawing. The functions of the CPU and the RAM are substantially identical to the functions of the CPU and the RAM of the main microcomputer 1. Therefore further descriptions thereof are omitted.

The sub microcomputer 3 is provided with a flash memory 3a. The flash memory 3a stores various data processing programs to be executed by the CPU, and initial setting values and the like relating to the data processing programs. Therefore, when the CPU executes processes according to a predetermined program, the program is read from the flash memory 3a and the processing is executed based on the program.

The disk playing unit 5 is provided with an optical pickup mechanism 51 (refer to FIG. 3) for reading data recorded on a disk by irradiation of laser light. The disk playing unit 5 is also provided with flexible cables (not shown in the drawing) that electrically connect the motor M, the optical pickup 51, and each component provided in the disk playing unit 5.

The receiver 6 is provided with an antenna and a tuner, so as to detect channels from modulated audio and video electromagnetic waves transmitted from a broadcasting station (not shown in the drawing). These image signals are demodulated and output to the image output unit 7, and the audio signals are output to the audio unit 8.

The image output unit 7 is provided with, for example, an LCD (liquid crystal display) or the like, and displays images based on the input image signals.

The audio output unit 8 is provided with speakers or the like, and output audio from the speakers or the like based on the input audio signals.

The operation unit 9 is provided with input elements, such as an operation panel and a remote control (not shown in the drawing) and the like. A user performs operations, such as cursor operation, icon specification, numeric input and the like using these input elements to input instruction data for execution of various processing such as, for example, selecting items on a menu image, and setting parameters and the like. The operation unit 9 outputs the input instruction data to the microcomputer 1.

The drive circuit unit 10 drives the motor M. The drive circuit unit 10 is provided with, for example, a control circuit (not shown in the drawing), and a plurality of transistors (not shown in the drawing). The switches configured by these transistors controllably turn ON/OFF the rotation of the motor.

Figure 4:
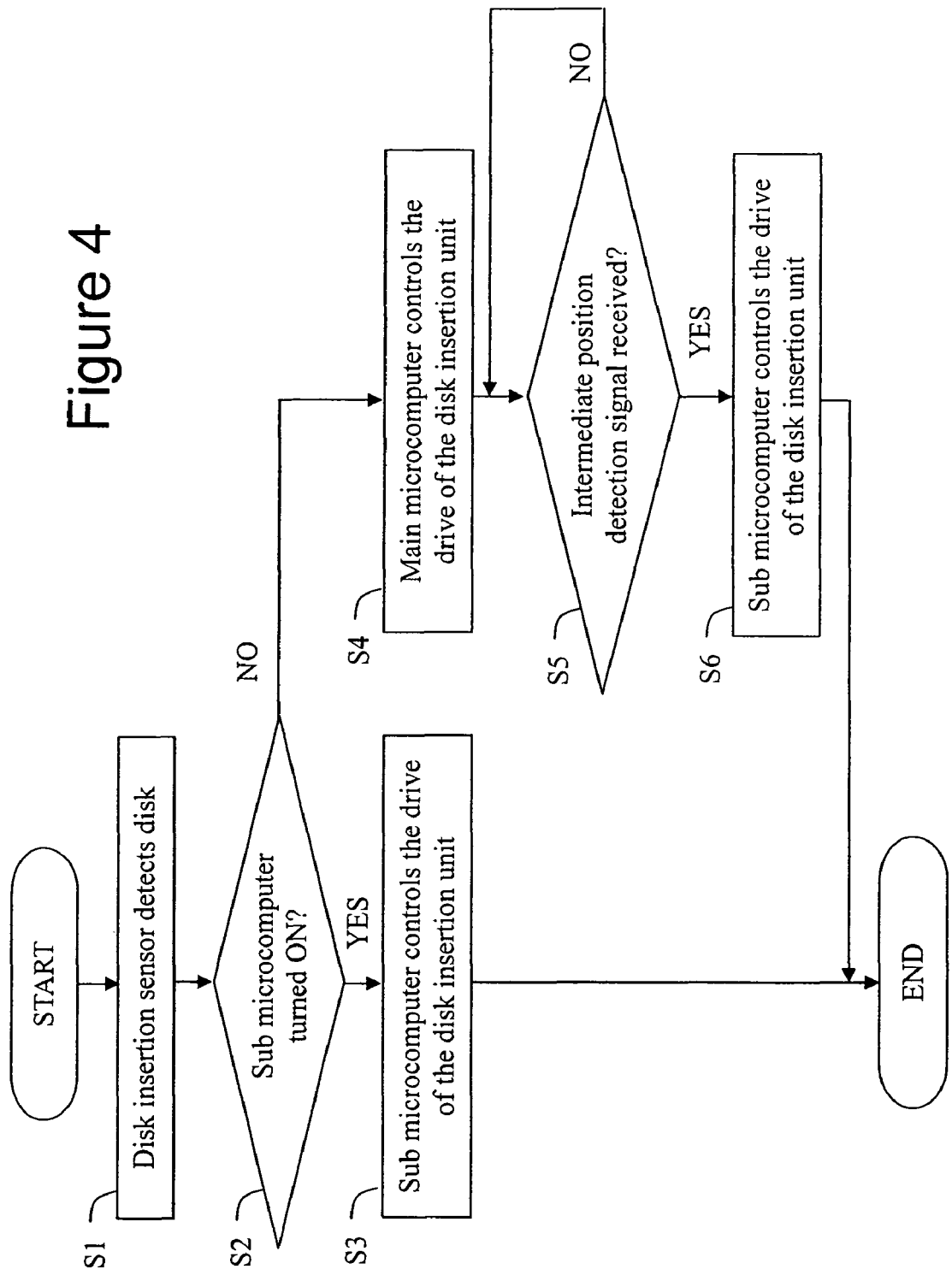
FIG. 4 is a flow chart of the disk insertion process of the television with disk playing function 100 of the first embodiment of the present invention.

The disk insertion process executed by the television with disk playing function 100 is described below using the flow chart of FIG. 4. The disk insertion process is started when a disk D is detected by the disk insertion sensor 11.

When a disk D is detected by the disk insertion sensor 11 (step S1), the main microcomputer 1 determines, by executing a predetermined program, whether or not the sub microcomputer 3 is started (step S2).

When the main microcomputer 1 determines that the sub microcomputer 3 is started (step S2: YES), the main microcomputer 1 outputs to the sub microcomputer 3 instructions to execute the drive control of the disk insertion unit 105. Accordingly, the sub microcomputer 3 executes the drive control (step S3) by sending predetermined control signals to the circuit unit 10, and this process ends.

When the main microcomputer 1 determines that the sub microcomputer 3 is not started (step S2: NO), however, the main microcomputer 1 executes the drive control of the disk insertion unit 105 by outputting the predetermined control signals to the drive circuit unit 10 directly (step S4). Also, the main microcomputer 1 turns ON the sub microcomputer 3 by controlling the sub power supply 4. Thus, when the time comes to turn over the drive control of the disk insertion unit 105 to the sub microcomputer 3 as described below, the sub microcomputer 3 is ready to drive the disk insertion unit 105.

In step S5, the main microcomputer 1 determines whether or not an intermediate position detection signal has been received from the first disk position sensor 12 (step S5).

When the main microcomputer 1 determines that an intermediate position detection signal has been received (step S5: YES), the main microcomputer 1 outputs to the sub microcomputer 3 and the drive circuit unit 10 instructions such that the sub microcomputer 3 takes over the drive control of the disk insertion unit 105 (step S6). The process ends.

When the main microcomputer 1 determines that an intermediate position detection signal has not been received in step S5 (step S5: NO), the main microcomputer 1 repeats the determination as to whether or not an intermediate position detection signal has been received until an intermediate position detection signal is received.

According to the above-described television with disk playing function 100, when a disk D is inserted and the sub microcomputer 3 for controllably driving the disk insertion unit 105 is turned OFF, the main microcomputer 1 controls the drive of the disk insertion unit 105 directly. In this way, the insertion of the disk D can be started quickly by the main microcomputer 1 without having to wait for the sub microcomputer 3 to start even when the sub microcomputer 3 is turned OFF at the time the disk is inserted. Accordingly, the disk D can be inserted in the disk insertion unit 105 with less likelihood of damage to the disk D.

Since the insertion of a disk D into the disk insertion unit 105 is started even when the sub microcomputer 3 for controllably driving the disk insertion unit 105 is turned OFF, the sub microcomputer 3 can be turned OFF when not required, thereby allowing energy consumption to be reduced.

Furthermore, although the main microcomputer 1 starts the drive control of the disk insertion unit 105 if the sub microcomputer 3 is turned OFF when a disk is inserted, the drive control of the disk insertion unit 105 is turned over from the main microcomputer 1 to the drive control of the sub microcomputer 3 after the disk D is accommodated in the device body 102. Thus, the same operation of controllably driving the disk insertion unit 105 for the sub control unit 3 (for example, a series of operations including an operation of drawing in a disk, operation of chucking a disk, operation of loading a disk and the like) can be accomplished by the man microcomputer 1 without having to modify the existing software programs. Therefore, not only are cost increases restrained, the operations subsequent to the operation of drawing in the disk (for example, the chucking operation, loading operation and the like) can be accomplished smoothly after the drive control of the disk insertion unit 105 is turned over to the sub microcomputer 3 during the disk draw-in operation.

Since the switching of the drive control by the main microcomputer 1 to the the sub microcomputer 3 is accomplished when the disk D is accommodated within the device body 102, there is no possibility that the disk D will be pulled out or fall from the device body 102 even when the switching of the driving control is not accomplished smoothly. Therefore, damage to the disk D can be prevented even more reliably.

Second Embodiment

A second embodiment of the present invention is described below in detail with reference to the drawings. The scope of the present invention is not limited to the illustrated examples. In view of the similarity between the first and second embodiments, structures identical to the television with disk playing function 100 of the first embodiment are designated by the same reference numbers. Moreover, the descriptions of the parts of the second embodiment that are identical to the parts of the first embodiment are omitted for the sake of brevity.

Figure 5:
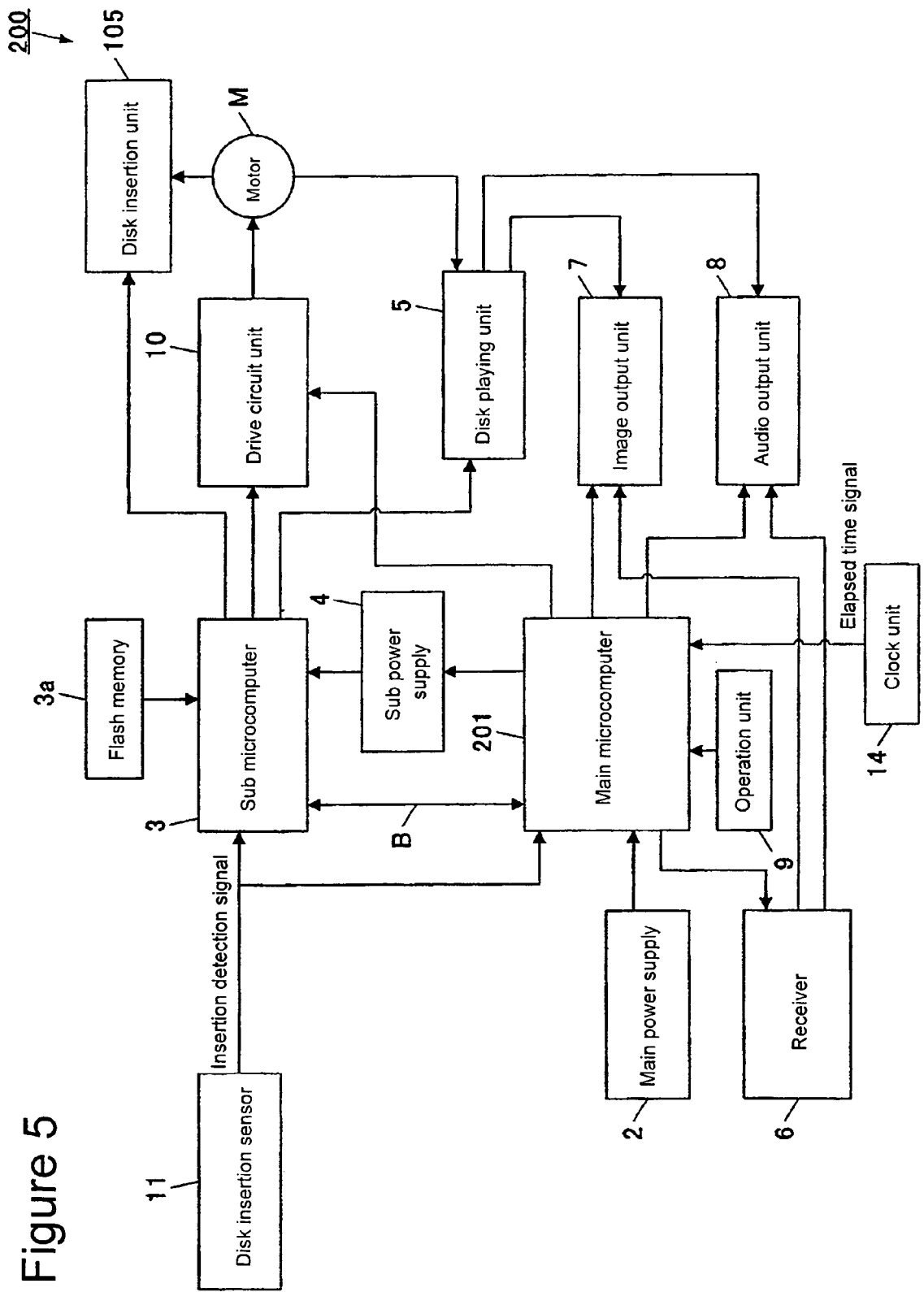
FIG. 5 is a block diagram showing the internal structure of the television with disk playing function 200 of a second embodiment of the present invention.

FIG. 5 is a block diagram showing the internal structure of a television receiver with a disk playing function (referred to hereinafter as "television with disk playing function") 200 as an example of a second embodiment of the present invention. As shown in FIG. 5, the television with disk playing function 200 is provided with a main microcomputer 201 as a main control unit which is for generally controlling the overall operation of the television with disk playing function 200; a main power supply 2, which is connected to the microcomputer 201 and supplies power to the microcomputer 201; a sub microcomputer 3 which is a sub control unit for controlling the drive of the disk insertion unit 105; a sub power supply 4, which is connected to the sub microcomputer 3 and supplies power to the sub microcomputer 3; a disk playing unit 5, which is controllably driven by the sub microcomputer 3 and plays a disk inserted in the disk insertion unit 105; a receiver 6 for receiving television broadcast signals; an image output unit 7 as a display unit which is for displaying television images based on television broadcast signals received by the receiver 6 and images played by the disk playing unit 5, and is controllably driven by the main microcomputer 201; an audio output unit 8 for outputting television audio based on television broadcast signals received by the receiver 6 and audio played by the disk playing unit 5; an operation unit 9 for inputting various kinds of instructions; a drive circuit unit 10 for driving a drive source motor M of the disk insertion unit 105 and the disk playing unit 5; a clock unit 14 for timing the elapsed time; and a flash memory 3a which functions as a recording unit of the sub microcomputer 3 and the like.

The disk insertion unit 105 is provided with a disk insertion sensor 11 and the like.

The main microcomputer 201 is provided with a CPU (central processing unit), a RAM (random access memory), a ROM (read only memory) and the like not shown in the drawing.

The CPU (not shown in the drawing) generally controls the overall operation of the television with disk playing function 200 by transferring instructions and data to various components of the television with disk playing function 200 in response to instructions input through the operation unit 9 or at a predetermined timing in accordance with various system programs stored in the ROM.

The RAM (not shown in the drawing) is used as a work area by the CPU, and temporarily stores in memory areas various programs read from the ROM and data related to the programs.

The ROM stores data processing programs to be executed by the CPU, and initial setting values and the like related to the data processing programs.

For example, when the CPU executes a program stored in the ROM, such that the main microcomputer 201 determines whether the sub microcomputer 3 is turned OFF when the disk insertion sensor 11 provided in disk insertion unit 105 sends an insertion detection signal to the main microcomputer 201. If the sub microcomputer 3 is determined to be turned OFF, the main microcomputer 201 turns ON the sub power supply 4. Then, when an elapsed time signal is received from the clock unit 14, the main microcomputer 201 outputs to the drive circuit unit 10 and the sub microcomputer 3 instructions to switch the drive control of the disk insertion unit 105 to the sub microcomputer 3.

The elapsed time signal is, for example, a signal representing the elapsed time counted by the clock unit 14 based on a clock start instruction that the main microcomputer 201 outputs when the main microcomputer 201 receives an insertion detection signal from the disk insertion sensor 11. More specifically, the elapsed time signal is a signal output to the main microcomputer 201 when the clock unit 14 counts time and a preset time has elapsed based on the instruction from the main microcomputer 201.

Figure 6:
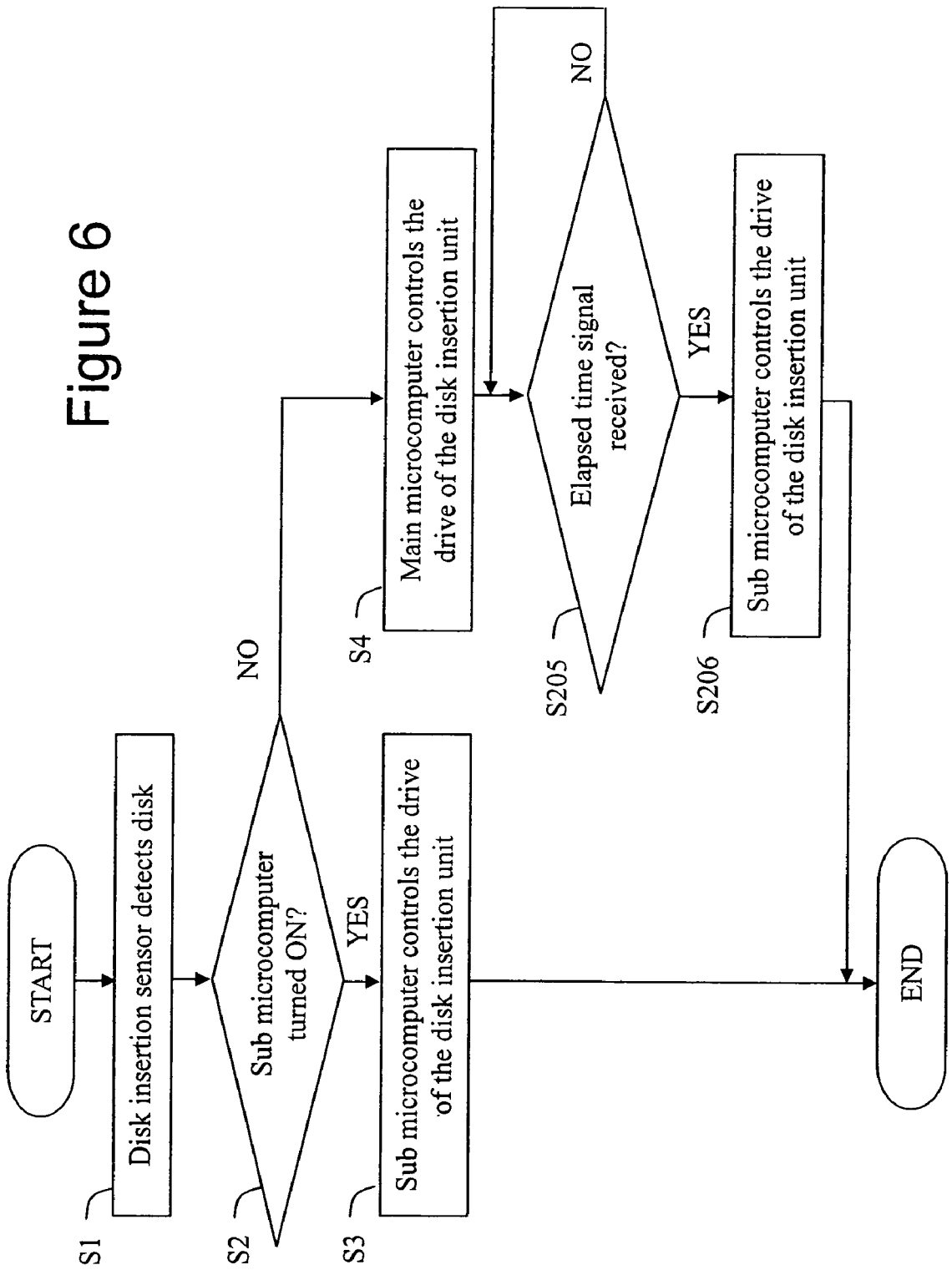
FIG. 6 is a flow chart of the disk insertion process of the television with disk playing function 200 of the second embodiment of the present invention.

The disk insertion process executed by the television with disk playing function 200 is described below using the flow chart shown in FIG. 6. The processes of steps S1 through S4 of this process are identical to the processes of steps S1 through S4 of the disk insertion process of the television with disk playing function 100, and are therefore identified by the same reference numbers, and further description thereof is omitted.

In step S205, the main microcomputer 201 determines whether or not an elapsed time signal has been received from the clock unit 14 (step S205).

When the main microcomputer 201 determines that an elapsed time signal has been received (step S205: YES), the main microcomputer 201 outputs to the drive circuit unit 10 and the sub microcomputer 3 instructions to switch the drive control of the disk insertion unit 105 to the sub microcomputer 3. Accordingly, the sub microcomputer 3 executes the drive control of the disk insertion unit 105 (step S206), and this process ends.

When the main microcomputer 201 determines that an elapsed time signal has not been received in step S205 (step S205: NO), the main microcomputer 201 repeats the determination as to whether or not an elapsed time signal has been received until an elapsed time signal is received.

According to the above-described television with disk playing function 200, when a disk is inserted while the sub microcomputer 3 is turned OFF and the drive control of the disk insertion unit 105 is started by the main microcomputer 201, the drive control of the disk insertion unit 105 is turned over from the main microcomputer 201 to the sub microcomputer 3 after a predetermined time has elapsed since the start of the disk insertion.

Therefore, the same operation of controllably driving the disk insertion unit for the sub microcomputer 3 (for example, a series of operations including an operation of drawing in a disk, operation of chucking a disk, operation of loading a disk and the like) can be performed by the main microcomputer 201 without having to modify the existing software programs, or without having to provide new detection units. Therefore, it is possible to restrain cost increases.

Furthermore, the operations subsequent to the operation of drawing in the disk (for example, the chocking operation, loading operation and the like) can be accomplished smoothly after the drive control of the disk insertion unit is switched over to the sub microcomputer 3 during the disk draw-in operation.

Third Embodiment

A third embodiment of the present invention is described below in detail with reference to the drawings. The scope of the present invention is not limited to the illustrated examples. Furthermore, in view of the similarities between the first and third embodiments, structures identical to the television with disk playing function 100 of the first embodiment are designated by the same reference numbers. Moreover, the descriptions of the parts of the third embodiment that are identical to the parts of the first embodiment are omitted for the sake of brevity.

Figure 7:
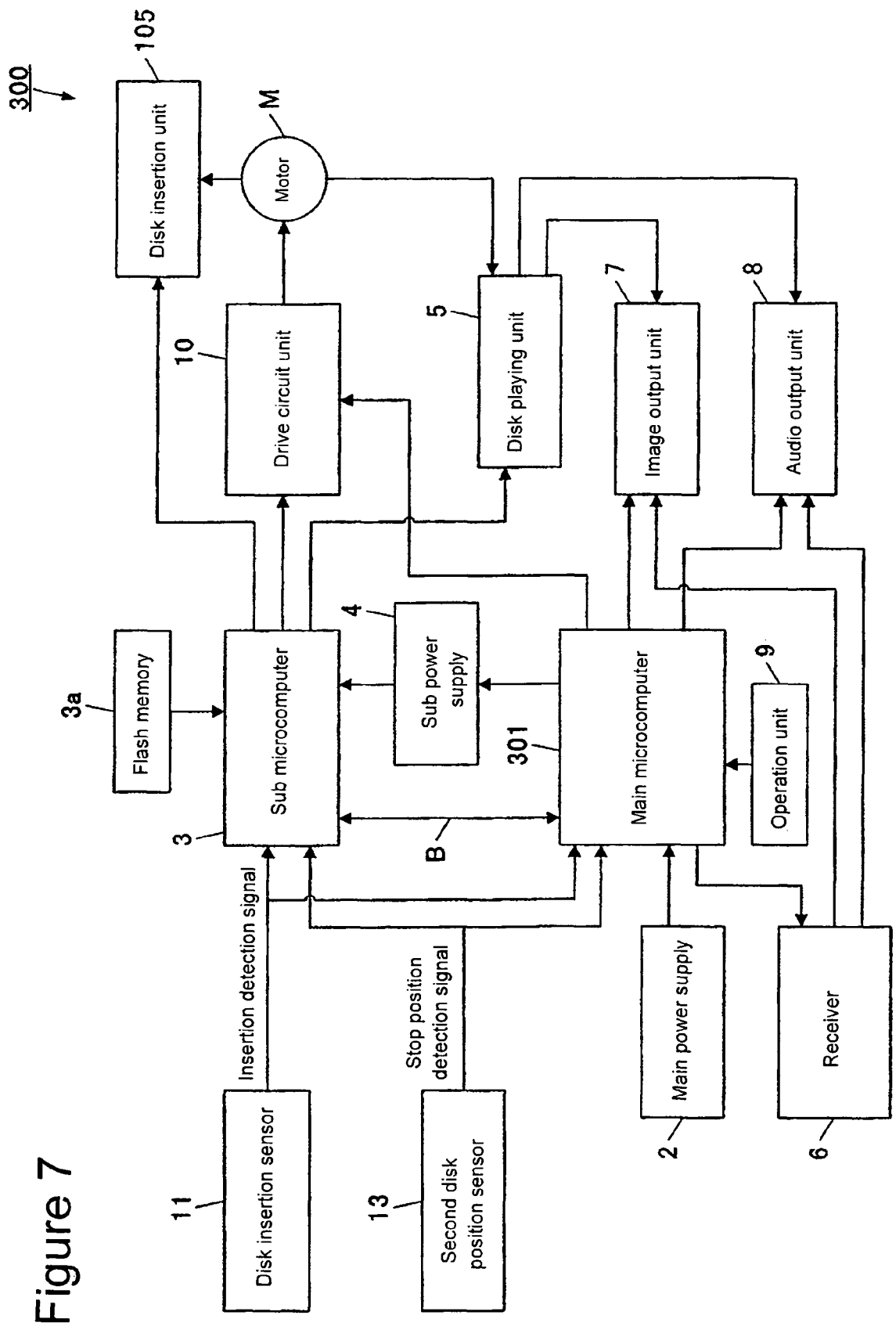
FIG. 7 is a block diagram showing the internal structure of the television with disk playing function 300 of a third embodiment of the present invention.

FIG. 7 is a block diagram showing the internal structure of a television receiver with a disk playing function (referred to hereinafter as "television with disk playing function") 300 as an example of a third embodiment of the present invention. As shown in FIG. 7, the television with disk playing function 300 is provided with a main microcomputer 301, which is a main control unit for generally controlling the overall operation of the television with disk playing function 300; a main power supply 2, which is connected to the microcomputer 301 and supplies power to the microcomputer 301; a sub microcomputer 3 which is a sub control unit for controlling the drive of the disk insertion unit 105; a sub power supply 4, which is connected to the sub microcomputer 3 and supplies power to the sub microcomputer 3; a disk playing unit 5, which is controllably driven by the sub microcomputer 3 and plays a disk inserted in the disk insertion unit 105; a receiver 6 for receiving television broadcast signals; an image output unit 7 which is a display unit for displaying television images based on television broadcast signals received by the receiver 6 and images played by the disk playing unit 5, and is controllably driven by the main microcomputer 301; an audio output unit 8 for outputting television audio based on television broadcast signals received by the receiver 6 and audio played by the disk playing unit 5; an operation unit 9 for inputting various kinds of instructions; and a drive circuit unit 10 for driving the drive source motors M of the disk insertion unit 105 and disk playing unit 5 and the like.

The disk insertion unit 105 is provided with a disk insertion sensor 11, and a second disk position sensor 13 and the like.

The second disk position sensor 13 functions as a stop position detection unit for outputting a stop position detection signal to the main microcomputer 301 when a disk D is inserted into the disk insertion slot 104 and arrives at a stop position P2 (refer to FIG. 3).

That is, when a disk D is completely inserted in the disk insertion unit 105 and arrives at the stop position P2, the disk D is detected by the second disk position sensor 13, which outputs a stop position detection signal to the main microcomputer 301. The disk D is then played by the disk playing unit 5 at the stop position P2.

The structure of the second disk position sensor 13 is identical to the structure of the disk insertion sensor 11 and first disk position sensor 12. The second disk position sensor 13 detects the H state when the disk D arrives between the photoemitting device (not shown in the drawings) and the photoreceiving device (not shown in the drawings), and outputs a stop position detection signal to the main microcomputer 301.

The main microcomputer 301 is provided with a CPU (central processing unit), a RAM (random access memory), a ROM (read only memory) and the like not shown in the drawing.

The CPU (not shown in the drawing) generally controls the overall operation of the television with disk playing function 300 by transferring instructions and data to various components of the television with disk playing function 300 in response to instructions input through the operation unit 9 or at a predetermined timing in accordance with various system programs stored in the ROM.

The RAM (not shown in the drawing) is used as a work area by the CPU, and temporarily stores in memory areas various programs read from the ROM and data related to the programs.

The ROM stores data processing programs executed by the CPU, and initial setting values and the like related to data processing programs.

For example, the CPU executes a program stored in the ROM, such that the main microcomputer 301 determines whether the sub microcomputer 3 is turned OFF when the disk insertion sensor 11 provided in disk insertion unit 105 sends an insertion detection signal to the main microcomputer 301. When the sub microcomputer 3 is determined to be turned OFF, the main microcomputer 301 turns ON the sub power supply 4 directly. When a stop position detection signal is received from the second disk position sensor 13, the main microcomputer 301 outputs instructions to the drive circuit unit 10 and the sub microcomputer 3 such that the drive control of the disk insertion unit 105 is turned over to the sub microcomputer 3.

The disk insertion process executed by the television with disk playing function 300 is described below using the flow chart shown in FIG. 8. The processes of steps S1 through S4 of this process are identical to the processes of steps S1 through S4 of the disk insertion process of the television with disk playing function 100, and are therefore identified by the same reference numbers and further description thereof is omitted.

In step S305, the main microcomputer 301 determines whether or not a stop position detection signal has been received from the second disk position sensor 13 (step S305).

When the main microcomputer 301 determines that a stop position detection signal has been received (step S305: YES), the main microcomputer 301 outputs to the drive circuit unit 10 and the sub microcomputer 3 instructions to switch the drive control of the disk insertion unit 105 to the sub microcomputer 3. Then, the sub microcomputer 3 executes the drive control of the disk insertion unit 105 accordingly (step S306), and this process ends. Accordingly, the sub microcomputer 3 performs the subsequent operations such as chucking operation and loading operation.

According to the above-described television with disk playing function 300, when a disk is inserted while the sub microcomputer 3 is turned OFF and the drive control of the disk insertion unit 105 is started by the main microcomputer 301, the drive control of the disk insertion unit 105 is turned over fro the main microcomputer 301 to the sub microcomputer 3 after the disk has arrived at the disk stop position P2.

In this way, a series of drive controls for the insertion of a disk into the disk insertion unit are all executed by the main microcomputer 301, and the insertion of a disk in the disk insertion unit 105 can be executed stably.

Moreover, the disk insertion sensor 11, the first disk position sensor 12, and the second disk position sensor 13 are not limited to the sensors shown in the various embodiments, inasmuch as other appropriate sensors other than infrared sensors may be used, such as, for example, magnetic sensors, mechanical sensors and the like.

Furthermore, the insertion detection signal, the intermediate position detection signal, and the stop position detection signal from the disk insertion sensor 11, the first disk position sensor 12, and the second disk position sensor 13 may also be output to both the main microcomputer and the sub microcomputer.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2005-025973. The entire disclosure of Japanese Patent Application No. 2005-025973 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A disk playing device, comprising:
   a body portion having a disk insertion slot formed thereon;
   a disk playing unit adapted to play a disk inserted through the disk insertion slot;
   a slot-in type disk insertion unit adapted to draw in the disk inserted in the disk insertion slot toward the disk playing unit;
   a sub control unit operatively connected to the disk insertion unit and the disk playing unit to drive the disk insertion unit and play the disk with the disk playing unit;
   a main control unit operatively connected to the disk playing unit, the disk insertion unit, and the sub control unit; and
   a disk insertion detection unit configured to detect a disk and output an insertion detection signal to the main control unit when the disk is inserted in the disk insertion slot,
   the main control unit being configured to determine whether or not the sub control unit is turned OFF when a disk insertion signal is received from the disk insertion detection unit, the main control unit being configured to drive the disk insertion unit when it is determined that the sub control unit is OFF.

2. The disk playing device of claim 1, further comprising:
   an intermediate position detection unit configured to detect the disk and output an intermediate position detection signal when the disk passes a predetermined position as the disk insertion unit draws in the disk toward the disk playing unit,
   when it is determined that the sub control unit is OFF at the time the disk insertion signal is received from the disk insertion detection unit, the main control unit being further configured to turn the sub control unit ON and, when an intermediate position detection signal is received from the intermediate position detection unit, the main control unit being further configured to turn over the driving of the disk insertion unit to the sub control unit.

3. The disk playing device of claim 1, further comprising:
   a clock unit configured to output an elapsed time signal to the main control unit when a predetermined time has elapsed after the insertion detection signal is received from the disk insertion detection unit, and
   when it is determined that the sub control unit is OFF at the time the disk insertion signal is received from the disk insertion detection unit, the main control unit being further configured to turn the sub control unit ON, the main control unit being further configured to turn over the driving of the disk insertion unit to the sub control unit when an elapsed time signal is received from the clock unit.

4. The disk playing device of claim 1, further comprising:
   a stop position detection unit configured to detect a disk and output a stop position detection signal when the disk inserted in the disk insertion slot arrives at a stop position, which is where the disk playing unit plays the disk; and
   when it is determined that the sub control unit is OFF at the time the disk insertion signal is received from the disk insertion detection unit, the main control unit being further configured to turn the sub control unit ON, the main control unit being further configured to turn over the driving of the disk insertion unit to the sub control unit when a stop position detection signal is received from the stop position detection unit.

5. The disk playing device of claim 1, further comprising:
a display unit operatively connected to and driven by the main control unit and configured to display images of the disk played by the disk playing unit.

6. The disk playing device of claim 1, further comprising:
a receiving unit adapted to receive television broadcast signals, and
the display unit being further configured to display television images based on the television broadcast signals received by the receiving unit.

7. A television receiver with disk playing function, comprising:
a body portion having a disk insertion slot formed thereon;
a disk playing unit adapted to play a disk inserted through the disk insertion slot;
a slot-in type disk insertion unit adapted to draw in a disk inserted in the disk insertion slot toward the disk playing unit;
a sub control unit operatively connected to the disk insertion unit and the disk playing unit to drive the disk insertion unit and play the disk with the disk playing unit;
a main control unit operatively connected to the disk playing unit, the disk insertion unit, and the sub control unit;
a receiving unit adapted to receive television broadcast signals;
a display unit operatively connected to and driven by the main control unit and configured to display images of the disk played by the disk playing unit and television images based on the television broadcast signals received by the receiving unit;
a disk insertion detection unit configured to detect a disk and output an insertion detection signal to the main control unit when the disk is inserted in the disk insertion slot; and
an intermediate position detection unit configured to detect the disk and output an intermediate position detection signal when the disk passes a predetermined position as the disk insertion unit draws in the disk toward the disk playing unit,
the main control unit being configured to determine whether or not the sub control unit is turned OFF when a disk insertion signal is received from the disk insertion detection unit, when it is determined that the sub control unit is OFF at the time the disk insertion signal is received from the disk insertion detection unit, the main control unit being configured to turn the sub control unit ON and drive the disk insertion unit, when an intermediate position detection signal is received from the intermediate position detection unit, the main control unit being further configured to turn over the driving of the disk insertion unit to the sub control unit.

* * * * *